US012631773B2

(12) United States Patent
Takahashi

(10) Patent No.: US 12,631,773 B2
(45) Date of Patent: May 19, 2026

(54) IMAGE PROCESSING APPARATUS, IMAGE PROCESSING METHOD, RADIATION IMAGING APPARATUS, AND STORAGE MEDIUM

(71) Applicant: CANON KABUSHIKI KAISHA, Tokyo (JP)

(72) Inventor: Naoto Takahashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 255 days.

(21) Appl. No.: 18/353,588

(22) Filed: Jul. 17, 2023

(65) Prior Publication Data

US 2024/0027632 A1     Jan. 25, 2024

(30) Foreign Application Priority Data

Jul. 20, 2022     (JP) ................................. 2022-115483

(51) Int. Cl.
    *G01T 1/17*    (2006.01)
    *H04N 5/32*    (2023.01)
    *H04N 25/77*    (2023.01)

(52) U.S. Cl.
    CPC ................. *G01T 1/17* (2013.01); *H04N 5/32* (2013.01); *H04N 25/77* (2023.01)

(58) Field of Classification Search
    CPC ............ G01T 1/17; H04N 5/32; H04N 25/77
    See application file for complete search history.

(56) References Cited

FOREIGN PATENT DOCUMENTS

| | | | |
|---|---|---|---|
| JP | 3445258 B2 | 9/2003 | |
| JP | 3903027 B2 | 4/2007 | |
| JP | 6139897 B2 | 5/2017 | |
| JP | 6677263 B2 * | 4/2020 | ............... A61B 6/00 |
| WO | WO 2017138097 A1 * | 8/2017 | ............... A61B 6/00 |

* cited by examiner

*Primary Examiner* — Edwin C Gunberg
*Assistant Examiner* — Richard O Toohey
(74) *Attorney, Agent, or Firm* — Canon U.S.A., Inc. IP Division

(57) ABSTRACT

An image processing apparatus that processes a radiation image captured using a grid for scattered radiation reduction includes a conversion unit configured to convert a frequency spectrum of a signal of a fundamental wave of the grid into a frequency spectrum of an n-th harmonic where n is an integer greater than 1, and a reduction unit configured to acquire a reduction image obtained by reducing the n-th harmonic in the radiation image, using an intensity of the signal obtained by the conversion.

8 Claims, 8 Drawing Sheets

FIG.2

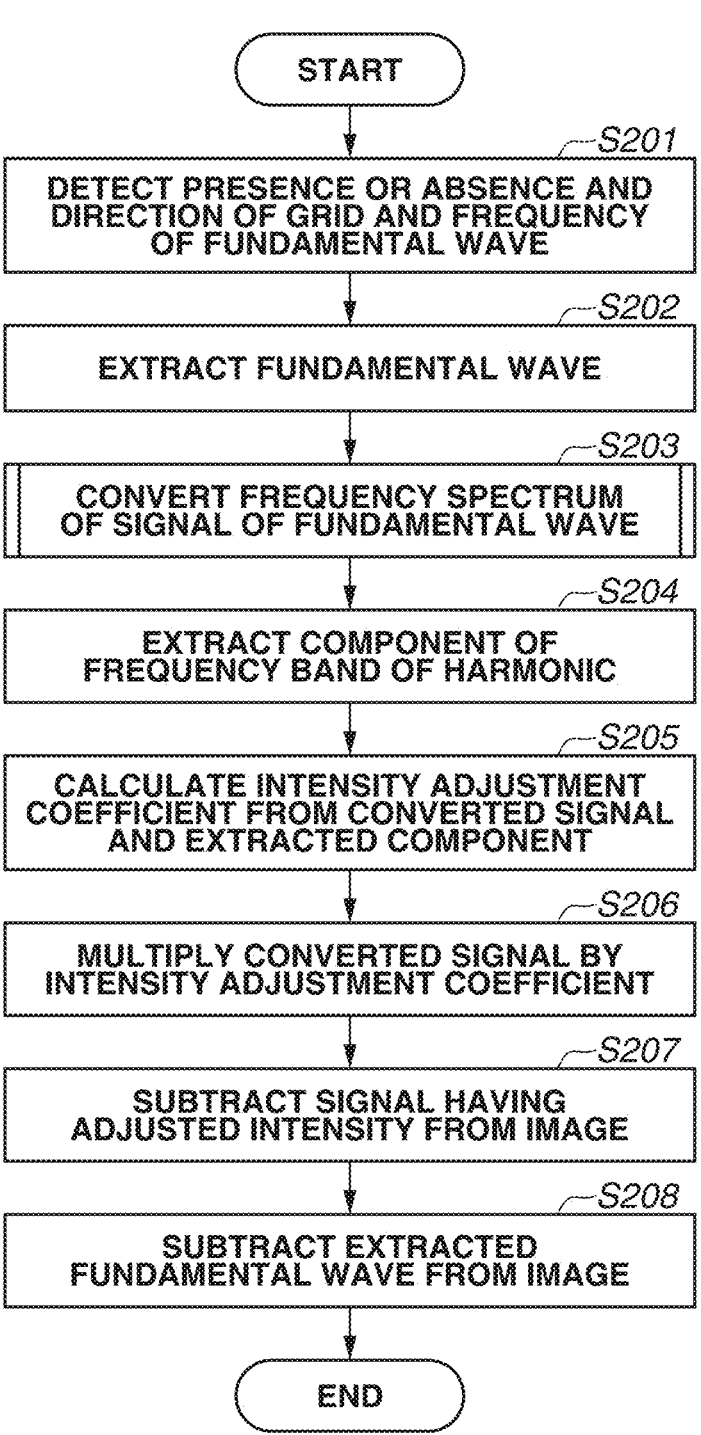

START

S201

DETECT PRESENCE OR ABSENCE AND
DIRECTION OF GRID AND FREQUENCY
OF FUNDAMENTAL WAVE

S202

EXTRACT FUNDAMENTAL WAVE

S203

CONVERT FREQUENCY SPECTRUM
OF SIGNAL OF FUNDAMENTAL WAVE

S204

EXTRACT COMPONENT OF
FREQUENCY BAND OF HARMONIC

S205

CALCULATE INTENSITY ADJUSTMENT
COEFFICIENT FROM CONVERTED SIGNAL
AND EXTRACTED COMPONENT

S206

MULTIPLY CONVERTED SIGNAL BY
INTENSITY ADJUSTMENT COEFFICIENT

S207

SUBTRACT SIGNAL HAVING
ADJUSTED INTENSITY FROM IMAGE

S208

SUBTRACT EXTRACTED
FUNDAMENTAL WAVE FROM IMAGE

END

FIG.8
801
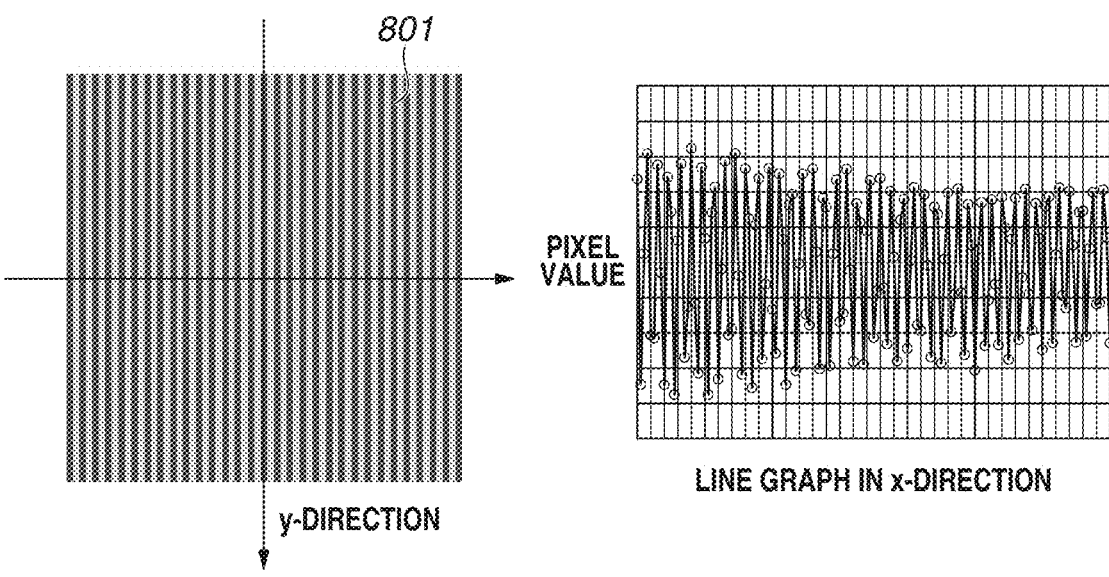
PIXEL
VALUE
LINE GRAPH IN x-DIRECTION
y-DIRECTION
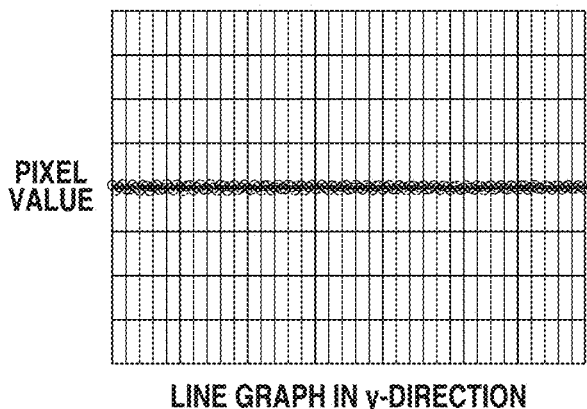
PIXEL
VALUE
LINE GRAPH IN y-DIRECTION

IMAGE PROCESSING APPARATUS, IMAGE PROCESSING METHOD, RADIATION IMAGING APPARATUS, AND STORAGE MEDIUM

BACKGROUND

Field

The present disclosure relates to an image processing apparatus that processes a radiation image, an image processing method, a radiation imaging apparatus and a storage medium.

Description of the Related Art

Conventionally, a technique for emitting radiation typified by an X-ray to an object and imaging the radiation having passed through the object using a flat-panel detector (hereinafter referred to as "FPD") is used in the medical field.

Since the radiation generates scattered radiation within the object, there is a case where an image is captured by placing an instrument termed a grid for removing the scattered radiation between the object and the FPD.

This grid removes the scattered radiation with a configuration in which a radiation blocking substance such as lead and a radiation transmission substance such as aluminum or carbon are alternately arranged at predetermined widths. The grid, however, may generate a periodic signal (also referred to as a "grid stripe") on the image and hinder an observer.

Conventionally, a method for reducing a grid stripe is discussed in order to address the issue. Japanese Patent No. 3903027 discusses a method for roughly extracting a frequency band including the components of a fundamental wave (also referred to as a "first harmonic") and a high-order harmonic using a filter, and applying a grid model to the roughly extracted components, thereby generating a grid image that does not include an object component and reducing a grid stripe.

In the method discussed in Japanese Patent No. 3903027, if the spectral intensity of the grid component included in the roughly extracted frequency band is relatively higher than the spectral intensity of the object component, it is possible to execute grid model fitting with high accuracy. Normally, the frequency of a grid is uniquely determined based on the grid density (lines/cm) and the sampling pitch (mm) of an FPD. Generally, the grid density is selected so that the frequency of the fundamental wave of the grid is high. This is because the higher the frequency is, the lower the spectral intensity of the object component is. Thus, it is possible to prevent the deterioration of the object component and also reduce a grid stripe. Also in the method discussed in Japanese Patent No. the 3903027, the higher the frequency is, the relatively lower the spectral intensity of the object component is. Thus, it is possible to reduce a grid stripe with high accuracy.

For example, there is a case where a so-called n-th harmonic having a frequency n times (n is an integer greater than 1) that of the fundamental wave of the grid has a low frequency in a relationship with the sampling pitch. For example, the n-th harmonic of the grid has a characteristic that the greater the order n is, the lower the spectral intensity is. Thus, for example, there is an issue that in the n-th harmonic, the spectral intensity of the object component is very high relative to the spectral intensity of the grid component, and the accuracy of estimating the grid decreases.

SUMMARY

According to an aspect of the present disclosure, an image processing apparatus that processes a radiation image captured using a grid for scattered radiation reduction includes a conversion unit configured to convert a frequency spectrum of a signal of a fundamental wave of the grid into a frequency spectrum of an n-th harmonic where n is an integer greater than 1, and a reduction unit configured to acquire a reduction image obtained by reducing the n-th harmonic in the radiation image, using an intensity of the signal obtained by the conversion.

Further features of the present disclosure will become apparent from the following description of exemplary embodiments with reference to the attached drawings.

BRIEF DESCRIPTION OF THE DRAWINGS

FIG. 2 is a flowchart illustrating a processing procedure of an image processing unit.

FIG. 8 is a diagram illustrating primary filtering.

DESCRIPTION OF THE EMBODIMENTS

Figure 1:
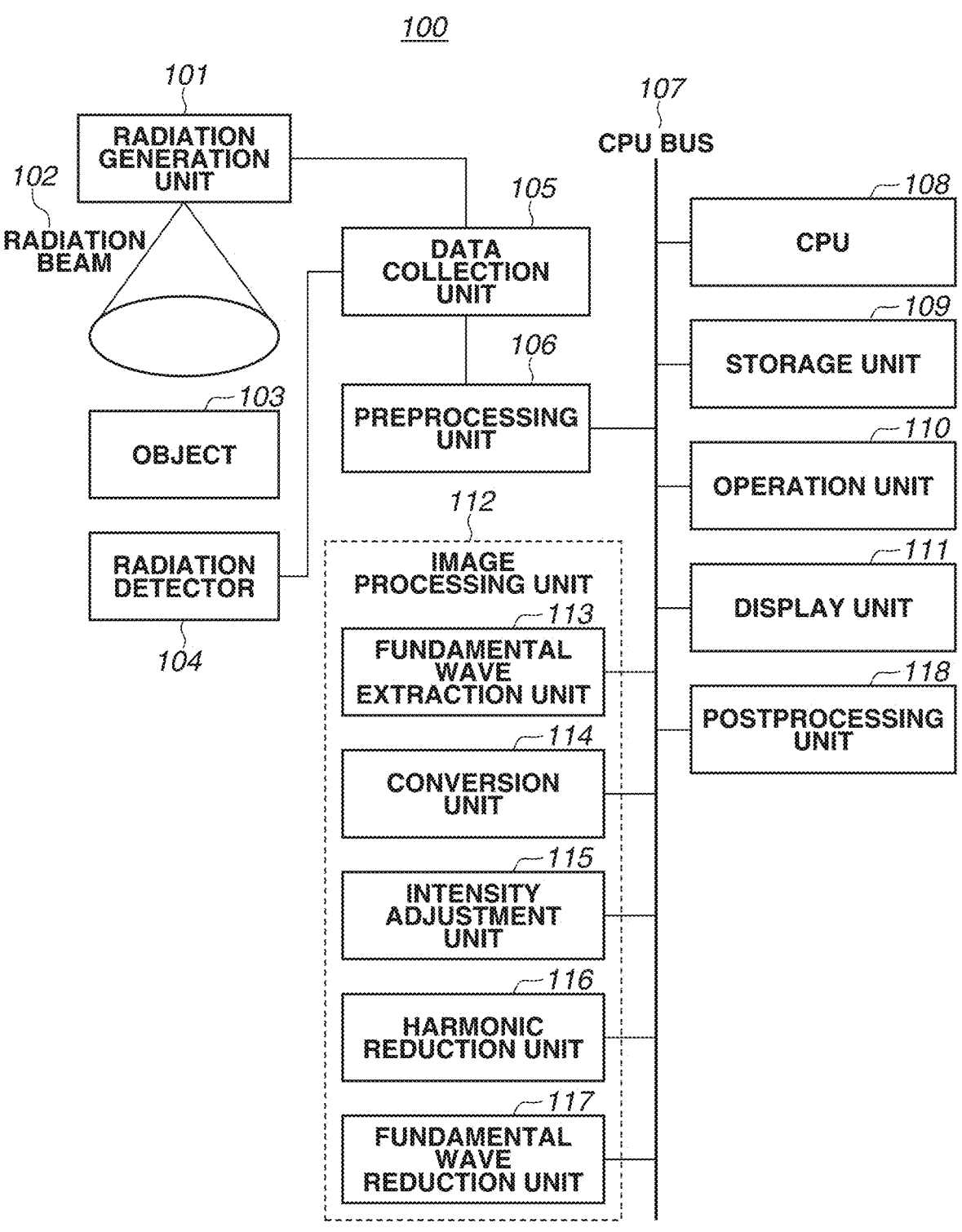
FIG. 1 is a diagram illustrating a configuration of an entirety of a radiation imaging apparatus.

The present invention is directed to preventing deterioration of an object component in a radiation image and also reducing an n-th harmonic of a grid with high accuracy.

An image processing apparatus according to an exemplary embodiment includes a conversion unit that converts a frequency spectrum of a signal of a fundamental wave of a grid for scattered radiation reduction into a frequency spectrum of an n-th harmonic (n is an integer greater than 1). Further, the image processing apparatus according to an exemplary embodiment includes a reduction unit that acquires a reduction image obtained by reducing the n-th harmonic in a radiation image, using an intensity of the signal obtained by the conversion.

Consequently, for example, it is possible to prevent deterioration of an object component in a radiation image and also reduce an n-th harmonic of a grid with high accuracy.

With reference to the drawings, exemplary embodiments for carrying out the present disclosure will be described in detail below. However, the dimensions, the materials, the shapes, and the relative positions of components described in the following exemplary embodiments are optional and can be changed according to the configuration of an apparatus to which the present disclosure is applied or various conditions. In the drawings, the same reference sign is used to indicate the same component or functionally similar components.

For example, a first exemplary embodiment is applied to a radiation imaging apparatus 100 as illustrated in FIG. 1. That is, the radiation imaging apparatus 100 is a radiation imaging apparatus having an image processing function for reducing a grid stripe in an image (a radiation image) obtained by radiation imaging. The radiation imaging apparatus 100 includes a radiation generation unit 101, a radiation detector 104, a data collection unit 105, a preprocessing unit 106, a central processing unit (CPU) 108, a storage unit 109, an operation unit 110, a display unit 111, an image processing unit 112, and a postprocessing unit 118. These components are connected to each other via a CPU bus 107 so that the components can transmit and receive data to and from each other. The "grid stripe" refers to a periodic signal generated due to a grid for scattered radiation reduction.

The image processing unit 112 reduces a grid stripe in an image (a radiation image) captured by the radiation detector 104. The image processing unit 112 includes a fundamental wave extraction unit 113, a conversion unit 114, an intensity adjustment unit 115, a harmonic reduction unit 116, and a fundamental wave reduction unit 117. The image processing unit 112 may include the conversion unit 114 and the harmonic reduction unit 116.

In the radiation imaging apparatus 100 as described above, first, the storage unit 109 stores various pieces of data for the processing of the CPU 108 and also functions as a working memory for the CPU 108. The CPU 108 controls the operation of the entirety of the apparatus according to an operation from the operation unit 110, using the storage unit 109. Consequently, the radiation imaging apparatus 100 operates as follows.

First, an operator selects a desired one of a plurality of imaging protocols using the operation unit 110, thereby giving an imaging instruction to the apparatus. An "imaging protocol" refers to a series of operation parameter sets used to perform a desired inspection. The plurality of imaging protocols is created in advance, whereby it is possible to easily set conditions suitable for to the inspection. Information regarding the imaging protocol is associated with various settings such as an imaging target part, imaging conditions (e.g., a tube voltage, a tube current, and an emission time), the presence or absence of the grid, the specifications of the grid (e.g., the focusing distance, the grid ratio, and the grid density), and image processing parameters. In the present exemplary embodiment, a grid stripe is reduced using the information regarding the grid associated with the imaging protocol. The method for reducing a grid stripe will be described below.

As described above, the imaging instruction input by the operator is transmitted from the CPU 108 to the data collection unit 105. If the CPU 108 receives the imaging instruction, the CPU 108 controls the radiation generation unit 101 and the radiation detector 104 to execute radiation imaging.

In the radiation imaging, first, the radiation generation unit 101 emits a radiation beam 102 to an object 103. The radiation beam 102 emitted from the radiation generation unit 101 passes through the object 103 while attenuating and reaches the radiation detector 104. Then, the radiation detector 104 outputs a signal according to the intensity of the radiation having reached the radiation detector 104. In the present exemplary embodiment, the object 103 is a human body. Thus, the signal output from the radiation detector 104 is data obtained by imaging the human body.

The data collection unit 105 converts the signal output from the radiation detector 104 into a predetermined digital signal and supplies the predetermined digital signal as image data to the preprocessing unit 106. The preprocessing unit 106 performs preprocessing such as offset correction and gain correction on the image data supplied from the data collection unit 105. The image data subjected to the preprocessing by the preprocessing unit 106 is sequentially transferred to the storage unit 109 and the image processing unit 112 via the CPU bus 107 under control of the CPU 108.

The image processing unit 112 executes image processing for reducing a grid stripe in the image data. The postprocessing unit 118 executes various processes such as a gradation process and an emphasis process on the image data processed by the image processing unit 112 to further obtain an image suitable for diagnosis. The image data processed by the postprocessing unit 118 is displayed on the display unit 111, confirmed by the operator, and then output to a printer (not illustrated). Then, a series of image imaging operations ends.

Figure 4:
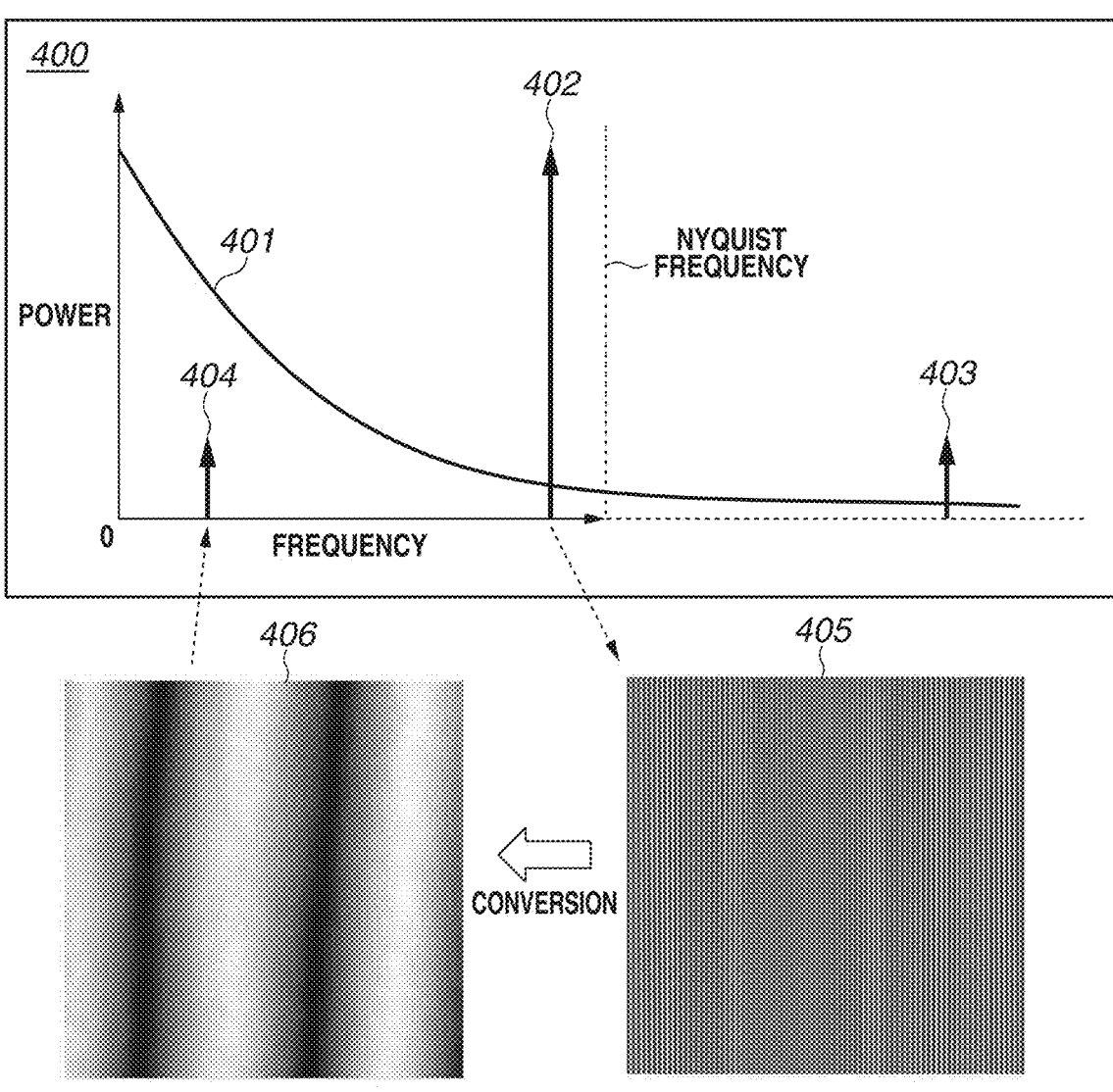
FIG. 4 is a diagram illustrating power spectra of a captured image captured with a grid attached to the radiation imaging apparatus of FIG. 1.

With reference to FIG. 4, first, a description is given of an overview of processing regarding the operation of the image processing unit 112 as the feature of the present exemplary embodiment, i.e., the operation of reducing a grid stripe in a captured image, in the radiation imaging apparatus 100 having the above configuration. FIG. 4 is a chart 400 illustrating the power spectra (the frequency spectra) of a captured image captured with the grid attached to the radiation imaging apparatus 100. The horizontal axis represents the frequency, and the vertical axis represents the power. This indicates that the greater the power is, the higher the signal intensity of the frequency is. A curve 401 indicates the power spectrum of an object component. Generally, the higher the frequency is, the lower the signal intensity is. On the other hand, an arrow 402 indicates the fundamental wave of the grid. As a spectrum, the fundamental wave appears as an approximate line spectrum having a high signal intensity. An arrow 403 indicates the second harmonic of the grid. The second harmonic appears as an approximate line spectrum having a frequency twice that of the fundamental wave. The signal intensity of the second harmonic is lower than that of the fundamental wave. Although not illustrated, the spectra of the third, fourth, . . . , n-th harmonics also occur at frequencies three, four, . . . , n times that of the fundamental wave. The greater the numerical value is, the lower the signal intensity is.

In a case where the frequency of the n-th harmonic exceeds the Nyquist frequency of a flat-panel detector (FPD), the component of the n-th harmonic is aliasing (folding noise). An arrow 404 indicates aliasing of the second harmonic, and a spectral peak occurs at the position of a low frequency obtained by folding the second harmonic with respect to the Nyquist frequency. Thus, a stripe having a high frequency due to the fundamental wave of the grid and a stripe having a low frequency due to the second harmonic of the grid appear on the image. As illustrated in FIG. 4, the spectral intensity of the fundamental wave is far higher than the spectral intensity of the object component and therefore is less influenced by the object component. Thus, it is possible to estimate the fundamental wave with high accuracy by fitting a grid model. On the other hand, the spectral intensity of the second harmonic folded into the low frequency is far lower than that of the object component. Thus, there is an issue that the spectral intensity of the second harmonic is greatly influenced by the object component, and the fitting accuracy decreases.

Accordingly, in the present exemplary embodiment, the frequency spectrum of a signal of the extracted fundamental wave is converted to match the frequency spectrum of the second harmonic, thereby estimating the second harmonic.

The component of the extracted fundamental wave does not include the object component as in a component 405 (hereinafter also referred to as a fundamental wave 405). Thus, this component is converted into a component 406 (hereinafter also referred to as a second harmonic 406) of the second harmonic, whereby it is possible to estimate the second harmonic without including the object component. Since a higher-order harmonic has a low signal intensity and is visually almost inconspicuous, harmonics up to the second harmonic are handled in the present exemplary embodiment. It is, however, also possible to estimate a higher-order harmonic using a similar method.

Figure 3:
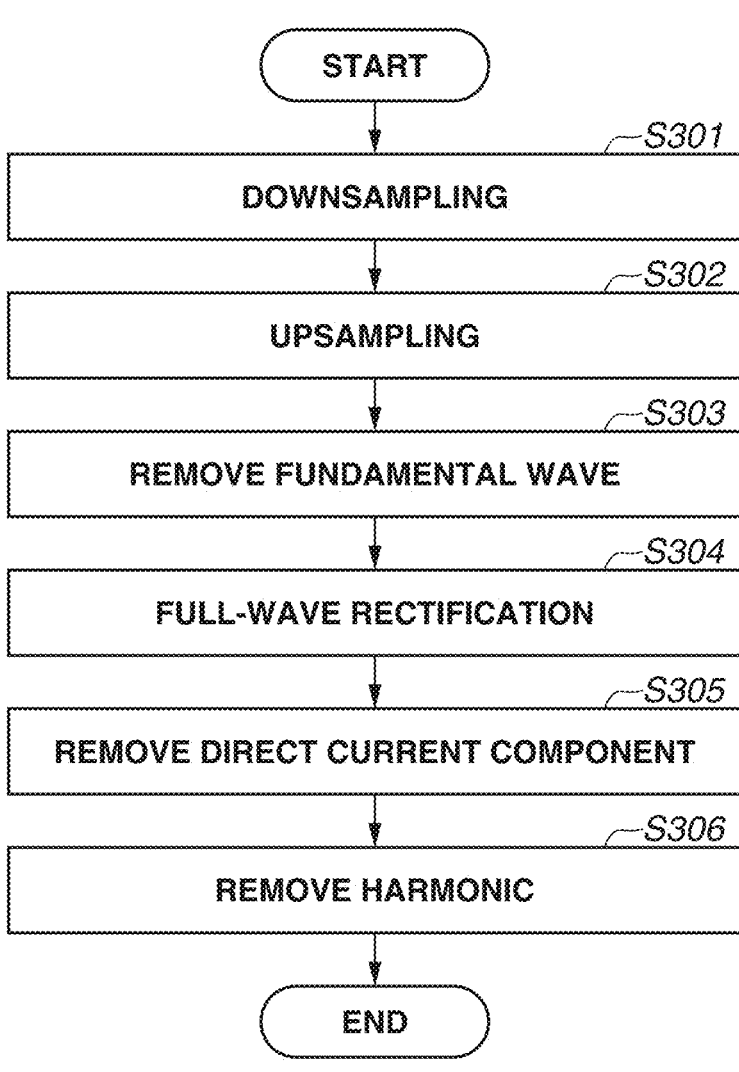
FIG. 3 is a flowchart illustrating a processing procedure of a conversion unit.

With reference to flowcharts in FIGS. 2 and 3, the details of the processing are described below. An input image in the present exemplary embodiment is data after logarithm transformation, i.e., data having a pixel value proportional to the logarithm of radiation close.

In step S201, image data obtained by the preprocessing unit 106 as described above is transferred to the image processing unit 112 via the CPU bus 107, and the fundamental wave extraction unit 113 detects the presence or absence and the direction of the grid and the frequency of the fundamental wave of the grid.

Although the method for detecting the fundamental wave of the grid is not particularly limited, for example, the method discussed in Japanese Patent No. 6139897, for which the applicant has already filed, is used. This method detects the presence or absence, the direction, and the frequency of a grid by comparing power spectra in a determined measurement area. The details of the method, however, are known by Japanese Patent No. 6139897, and therefore are not described here.

In the present exemplary embodiment, a configuration is employed in which the fundamental wave extraction unit 113 detects the presence or absence and the direction of the grid from the image. If, however, the presence or absence and the direction of the grid is known in advance, this information may be used. For example, the presence or absence and the direction of the grid may be set in association with the imaging protocol in advance, and this information may be acquired when the image is captured. The frequency of the fundamental wave of the grid may be calculated from the grid density associated with the imaging protocol. Specifically, if the density of the grid is D (lines/cm), and the sampling pitch of the FPD is S (mm), a frequency fg (rad/sample) of the fundamental wave of the grid can be calculated using the following expression.

$$f_g = 2\pi \cdot \left| \frac{D \cdot S}{10} - k \right| \tag{1}$$

However, k is an integer satisfying the following conditional expression.

$$0 \leq f_g \leq \pi \tag{2}$$

The grid expands due to manufacturing variation or depending on the distance from the FPD, and therefore, the calculation using the above expression increases an error in accuracy. Thus, it is more desirable to analyze the grid from the image as in the present exemplary embodiment.

Next, in step S202, the fundamental wave extraction unit 113 extracts the component of the fundamental wave of the grid. Although the method for extracting the fundamental wave is not particularly limited, for example, the method discussed in Japanese Patent No. 3445258, for which the applicant has already filed, is used. This method estimates the fundamental wave of a grid from a component roughly extracted by filtering. The details of the method, however, are known by Japanese Patent No. 3445258, and therefore are not described here.

Figure 5:
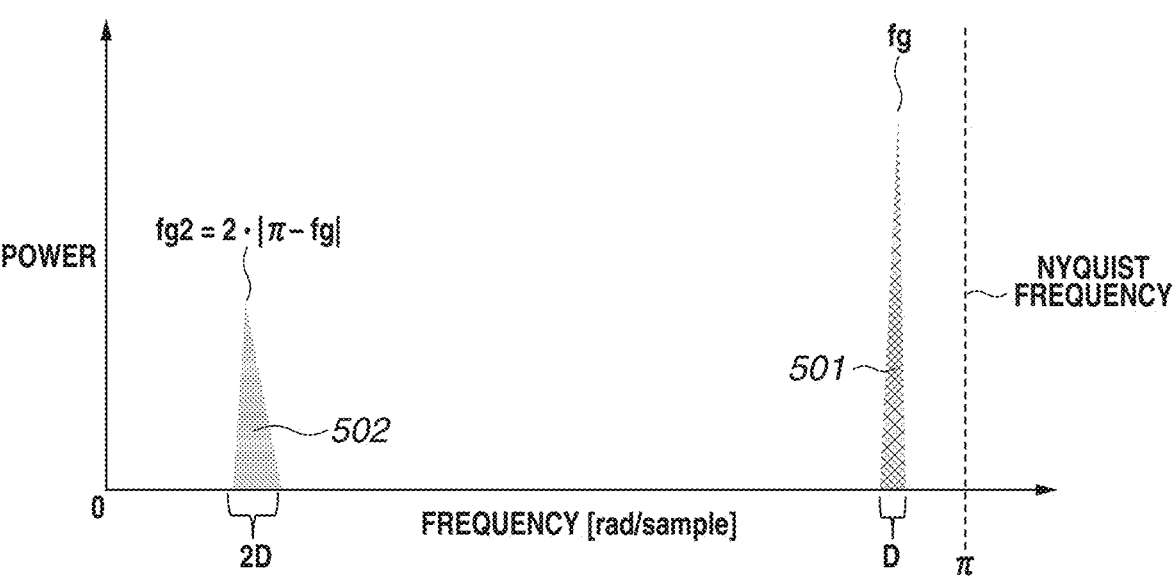
FIG. 5 is a diagram illustrating a relationship between spectra of a fundamental wave and a second harmonic.

Next, in step S203, the conversion unit 114 converts the frequency spectrum of a signal of the fundamental wave to approximately match the frequency spectrum of the second harmonic. FIG. 5 illustrates the relationship between the spectra of the fundamental wave and the second harmonic. A portion 501 indicates the spectrum of the fundamental wave and is an approximate line spectrum centered at the frequency fg. D indicates the broadening of the spectrum, and the spectrum has a shape slightly broadening due to variation in the grid density (the frequency). On the other hand, a portion 502 indicates the spectrum of the second harmonic. The spectrum of the second harmonic is different in intensity from that of the fundamental wave, but is a spectrum having broadening twice that of the fundamental wave. The broadening of the spectrum of the second harmonic has a mirror-image relationship with the broadening of the spectrum of the fundamental wave. Further, a frequency fg2 of the second harmonic is uniquely determined based on the frequency fg of the fundamental wave and the Nyquist frequency. Although the following description is given using the frequency fg2 of the second harmonic, a frequency fgn (n is an integer greater than 1) of the n-th harmonic may be used in the present exemplary embodiment of the present disclosure.

The spectrum is converted using the above relationship. FIG. 3 illustrates the details of the processing in step S203. FIGS. 6A to 6F are diagrams illustrating the process of changes in spectra in respective processes. With reference to FIGS. 3 and 6A to 6F, the details of the conversion are described below.

Figure 6A:
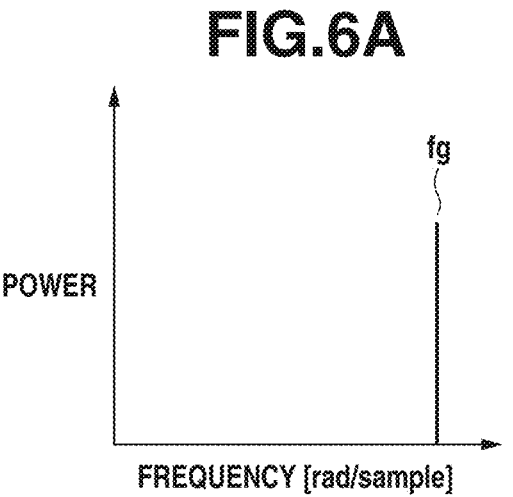
FIGS. 6A to 6F are diagrams illustrating spectrum conversion.
Figure 6B:
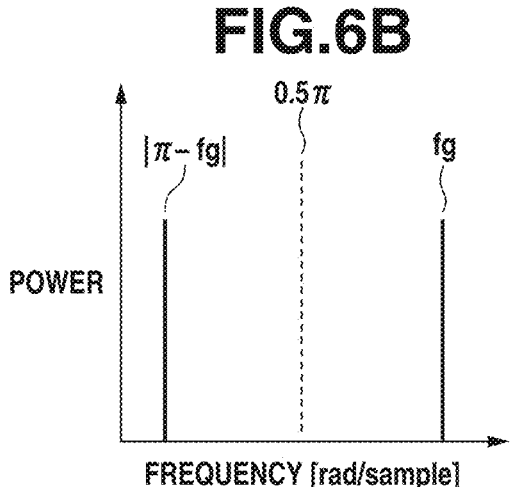

First, in step S301, the component of the fundamental wave extracted by the fundamental wave extraction unit 113, which has a spectrum illustrated in FIG. 6A, is downsampled. Then, in step S302, the component of the fundamental wave is upsampled. Thus, the spectrum of the fundamental wave is converted into a spectrum illustrated in FIG. 6B. By this process, a spectrum due to aliasing is generated at a position obtained by folding the fundamental wave with respect to a frequency of $0.5\pi$, which is half the Nyquist frequency. This spectrum has a mirror-image relationship with the spectrum of the fundamental wave. At this time, the conversion unit 114 may convert the signal of the fundamental wave of the grid so that the spectra (the spectral shapes) before and after the conversion have a mirror-image relationship with each other. As a specific process, if the component of the fundamental wave of the grid at each pixel (x,y) is G(x,y), the conversion is performed using the following expression.

$$S_{i,j}(x, y) = \begin{cases} G(x, y), & (x \bmod 2) = i \cap (y \bmod 2) = j \\ 0, & \text{otherwise} \end{cases} \tag{3}$$

In this expression, i,j are variables indicating addresses into which 0 is inserted, and take a value of 0 or 1. Thus, four pieces of data are generated after the conversion, and all the four pieces of data are data having the spectrum illustrated in FIG. 6B.

Figure 6C:
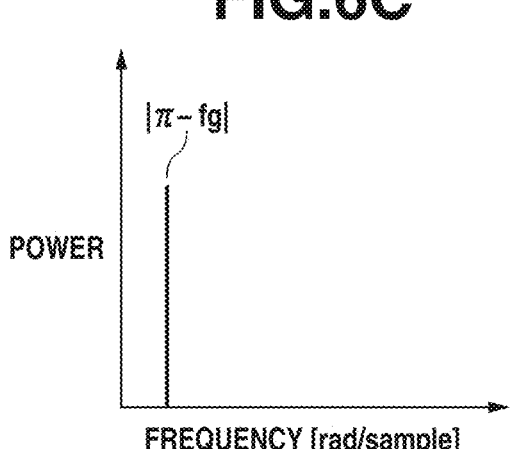

Next, in step S303, data obtained by removing the spectrum of the fundamental wave as illustrated in FIG. 6C is generated. Specifically, filtering is performed using a low-pass filter (LPF) with a stopband at the frequency fg of the fundamental wave. Although the LPF is not particularly limited, LPF(k) in the following expression is used in the present exemplary embodiment.

$$LPF(k) = \frac{h(k) \cdot w(k)}{g} \tag{4}$$

$$h(k) = \begin{cases} \dfrac{f}{\pi}, & n = \dfrac{N}{2} \\ \dfrac{\sin\left(\left(k - \dfrac{N}{2}\right)(f)\right)}{\left(k - \dfrac{N}{2}\right)\pi}, & \text{otherwise} \end{cases}$$

$$g = \sum_{j=0}^{N} h(j) \cdot w(j)$$

In this expression, N represents the order of the filter, and f is a parameter defining a passband and is $0.5\pi$ in the present exemplary embodiment. Further, w(k) represents a window function, and the Kaiser window is used in the present exemplary embodiment. The Kaiser window is known, and therefore is not described.

Figures 7A, 7B:
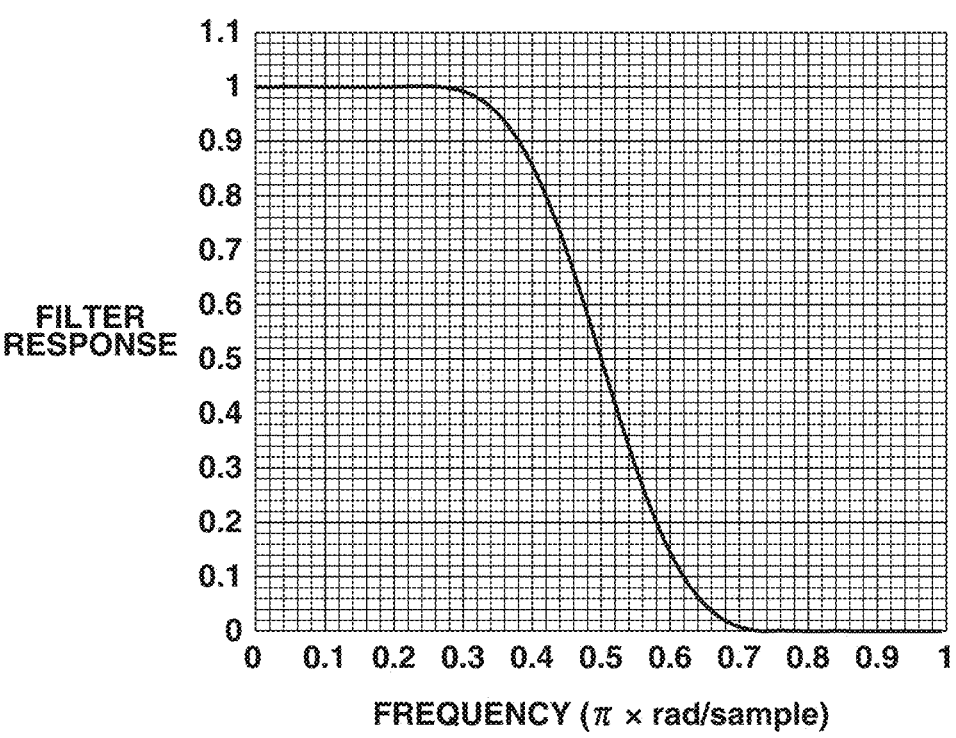
FIGS. 7A and 7B are examples of filter characteristics.

FIG. 7A illustrates an example of the filter characteristic of the designed LPF. FIG. 7A illustrates a characteristic of removing a frequency greater than or equal to $0.5\pi$ (rad/sample). It is possible to remove the frequency fg of the fundamental wave using this filter. The filtering is performed on each of the four pieces of data $S_{i,j}$ generated in step S302. The filtering is performed in a direction orthogonal to the stripe of the grid. For example, as illustrated in FIG. 8, if the grid stripe is in the vertical direction (801), a periodic signal of the fundamental wave appears in an x-direction as in the diagram illustrated on the upper right of FIG. 8. Thus, one-dimensional filtering is performed in the x-direction. On the other hand, although not illustrated, if the grid stripe is in the horizontal direction, a periodic signal of the fundamental wave appears in a y-direction. Thus, one-dimensional filtering is performed in the y-direction.

Although one-dimensional filtering is performed in the present exemplary embodiment, two-way filtering, i.e., two-dimensional filtering, may be performed to reduce the influence of noise.

Next, in step S304, a frequency $|\pi-fg|$ having a spectral peak illustrated in FIG. 6C is converted into a frequency $2|\pi-fg|$, which is twice the frequency $|\pi-fg|$, and the broadening of the spectrum is also doubled by conversion. If the frequency is doubled, the broadening of the spectrum inevitably increases. Thus, the operation of doubling the frequency is simply performed. Specifically, the frequency is doubled by conversion by performing full-wave rectification. The full-wave rectification is the process of converting the negative value of a signal into a positive value. The pieces of data $S_{i,j}$ filtered in step S303 are converted using the following expression. In the following expression, the process of averaging the four pieces of data is also performed, thereby generating a single piece of data D obtained by integrating the four pieces of data.

$$D(x, y) = \frac{1}{4} \cdot \sum_{i=0}^{1} \sum_{j=0}^{1} |S_{i,j}(x, y)| \tag{5}$$

Figure 6D:
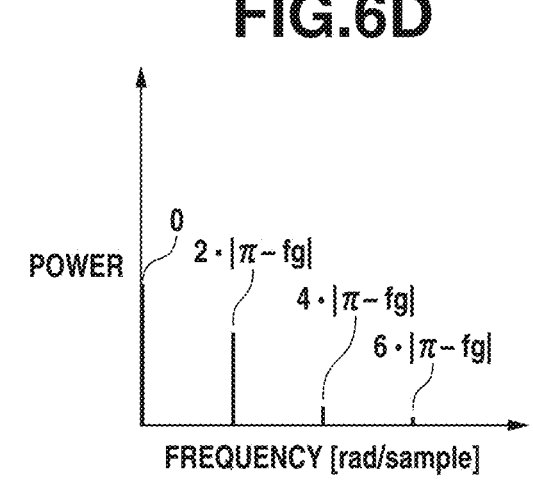
Figure 6E:
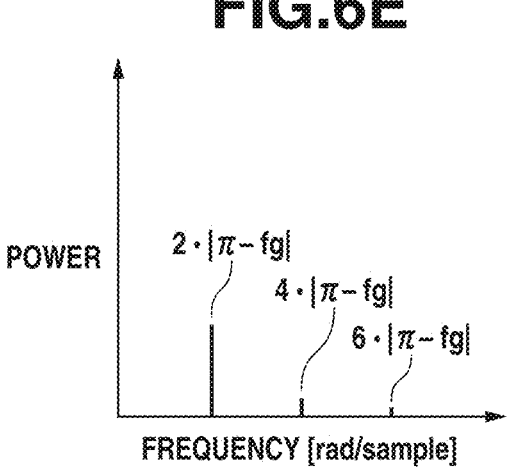
Figure 6F:
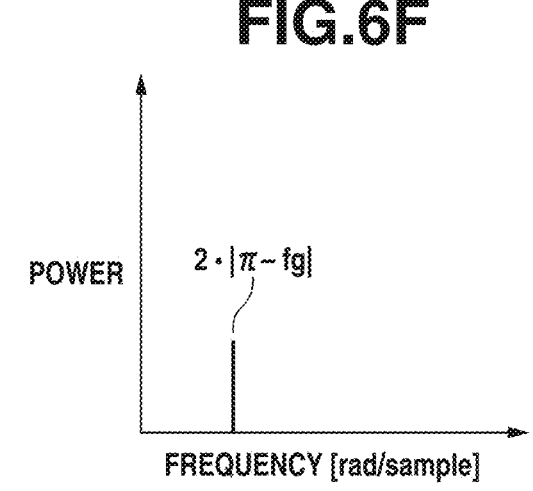

FIG. 6D is a diagram illustrating spectra after the full-wave rectification. In the spectra after the full-wave rectification, a spectral peak appears at a frequency $2|\pi-fg|$. In addition to this, a spectral peak of a harmonic due to a direct-current component and distortion occurs. Accordingly, in step S305, the direct-current component is removed. Specifically, from a value D(x,y) of each pixel (x,y), the average value of the value D is subtracted, thereby removing the direct-current component.

Next, in step S306, the harmonic is removed. Specifically, filtering is performed using an LPF with a stopband at a frequency greater than or equal to a frequency $4|\pi-fg|$ at which the harmonic is generated. The filtering is similar to that in step S303, and therefore may be performed by setting f in expression (4) according to the stopband.

The operation of the conversion unit 114 has been described above. By this conversion, it is possible to generate data obtained by converting the fundamental wave 405 in FIG. 4 into the second harmonic 406. The signal intensity of the second harmonic changes depending on the image, and therefore, the intensity adjustment unit 115 adjusts the signal intensity.

First, in step S204, the component of the frequency band of the harmonic is extracted from input data as a processing target of grid stripe reduction. Specifically, a band-pass filter (BPF) with a passband at the frequency fg2 of the second harmonic is designed, and the component is extracted by filtering. Although the method for designing the BPF is not particularly limited, BPF(k) is designed in the following expression in the present exemplary embodiment.

$$BPF(k) = \frac{h(k) \cdot w(k)}{g} \tag{6}$$

$$h(k) = \begin{cases} \dfrac{\Delta f}{\pi}, & n = \dfrac{N}{2} \\ \dfrac{\sin\left(\left(k - \dfrac{N}{2}\right)\left(fg2 + \dfrac{\Delta f}{2}\right)\right) - \sin\left(\left(k - \dfrac{N}{2}\right)\left(fg2 - \dfrac{\Delta f}{2}\right)\right)}{\left(k - \dfrac{N}{2}\right)\pi}, & \text{otherwise} \end{cases}$$

$$g = \left| \sum_{j=0}^{N} h(j) \cdot w(j) \cdot \exp\left(-2\pi i \cdot fg2\right) \right|^2$$

In this expression, i represents an imaginary number, and N represents the order of the filter. $\Delta f$ is a parameter defining the bandwidth of the passband, and may be optionally set so that a desired frequency band can be extracted. Further, w(k) represents a window function, and the Kaiser window is used in the present exemplary embodiment. The Kaiser window is known, and therefore is not described here.

FIG. 7B illustrates an example of the filter characteristic of the designed BPF. FIG. 7B illustrates the filter designed on the assumption that the frequency of the second harmonic is $0.1\pi$ (rad/sample) (701) and $\Delta f$ is $0.05\pi$ (rad/sample) (702). It is possible to extract only the frequency component centered at the second harmonic by filtering using this BPF.

The filtering is performed in a direction orthogonal to the stripe of the grid. For example, as illustrated in FIG. 8, if the grid stripe is in the vertical direction (801), a periodic signal of the second harmonic appears in the x-direction as in the diagram illustrated on the upper right of FIG. 8. Thus, one-dimensional filtering is performed in the x-direction. On the other hand, although not illustrated, if the grid stripe is in the horizontal direction, a periodic signal of the second harmonic appears in the y-direction. Thus, one-dimensional filtering is performed in the y-direction.

Next, in step S205, an intensity adjustment coefficient a is calculated so that the signal intensities of a second harmonic I extracted in step S204 and a second harmonic D estimated by the conversion unit 114 are similar to each other. Specifically, the intensity adjustment coefficient a satisfying the following expression is calculated by least-squares approximation.

$$a(x,\ y) = \arg\min_{a} \sum_{i=-\Delta x}^{\Delta x} \sum_{j=-\Delta y}^{\Delta y} (I(x+i,\ y+j) - a \cdot D(x+i,\ y+j))^2 \qquad (7)$$

In this expression, a(x,y) is the intensity adjustment coefficient a at a pixel (x,y) and represents a value obtained from a local area ($\pm\Delta x, \pm\Delta y$) centered on the pixel (x,y) using the method of least squares.

The second harmonic I also includes the object component, and therefore, there may be a case where the obtained intensity adjustment coefficient a is inappropriate.

Accordingly, if the value of a(x,y) extremely deviates from the average value, a(x,y) is regarded as an abnormality and corrected. Specifically, if a(x,y) exceeds the average value of the intensity adjustment coefficient a $\pm 2\sigma$, a(x,y) is regarded as an abnormality, and the value of a(x,y) is replaced by the average value of the intensity adjustment coefficient a. Consequently, it is possible to calculate an intensity adjustment coefficient robust against the object component.

Next, in steps S206 and S207, the harmonic reduction unit 116 reduces the second harmonic in the input data as the processing target of the grid stripe reduction. At this time, the image processing unit 112 (e.g., the harmonic reduction unit 116), which is an example of the technique according to the present disclosure, can acquire a reduction image obtained by reducing the n-th harmonic in the radiation image, using an intensity of a signal obtained by the conversion by the conversion unit 114. At this time, the image processing unit 112 (e.g., the intensity adjustment unit 115), which is an example of the technique according to the present disclosure, can adjust the signal obtained by the conversion by the conversion unit 114 so that an intensity of the signal obtained by the conversion by the conversion unit 114 is an intensity of a frequency spectrum including the n-th harmonic (e.g., the second harmonic I extracted in step S204) in the radiation image, for example, using the intensity adjustment coefficient. Specifically, calculation is performed using the following expression, where the input data is Org, the second harmonic estimated by the conversion unit 114 is D, and the intensity adjustment coefficient calculated by the intensity adjustment unit 115 is a.

$$\text{Out}(x,y)=\text{Org}(x,y)-a(x,y)\cdot D(x,y) \qquad (8)$$

Next, in step S208, the fundamental wave reduction unit 117 further reduces the fundamental wave. The fundamental wave is reduced by subtracting the fundamental wave extracted by the fundamental wave extraction unit 113 from an image Out obtained by reducing the second harmonic.

Based on the above, in the present exemplary embodiment, a second harmonic is estimated from a fundamental wave, whereby it is possible to prevent the deterioration of an object and also reduce a grid stripe. Although the second harmonic is estimated according to the flowchart in FIG. 3 in the present exemplary embodiment, the estimation method is not limited to this. For example, the second harmonic can be estimated even if steps S302 and S303 in FIG. 3 are skipped. In this case, the estimation image is an image reduced to ½ by downsampling. Accordingly, if the input data in which the second harmonic is to be reduced is also similarly reduced to ½, and the image is enlarged after the second harmonic is reduced, a similar process can be performed. Specifically, the processed image Out can also be generated using the following expression, where the input data before the reduction is Org, the result of enlarging the reduced image in which the second harmonic is reduced is M', and the result of enlarging the reduced image before the second harmonic is reduced is M.

$$\text{Out}(x,y)=\text{Org}(x,y)-[M(x,y)-M'(x,y)] \qquad (9)$$

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-115483, filed on Jul. 20, 2022, which is hereby incorporated by reference herein in its entirety.

What is claimed is:

1. An image processing apparatus that processes a radiation image captured using a grid for scattered radiation reduction, the image processing apparatus comprising:
   at least one memory storing a program; and
   at least one processor that executes the stored program, which causes the at least one processor to:
   convert a frequency spectrum of a signal of a fundamental wave of the grid into a frequency spectrum of an n-th harmonic so that in a case where a frequency of a peak of the fundamental wave of the grid is fg and a frequency of a peak of the n-th harmonic of the grid is fgn, the frequency fg of the peak of the fundamental wave is the frequency fgn, where n is an integer greater than 1; and acquire a reduction image obtained by reducing the n-th harmonic in the radiation image, using an intensity of the signal obtained by the conversion.

2. The image processing apparatus according to claim 1, wherein the at least one processor further:

extracts the signal of the fundamental wave of the grid using the radiation image; and subtracts the extracted signal from the radiation image.

3. The image processing apparatus according to claim 1, wherein the at least one processor converts the frequency spectrum of the signal of the fundamental wave of the grid so that spectral shapes before and after the conversion have a mirror-image relationship with each other.

4. The image processing apparatus according to claim 1, wherein the at least one processor converts the frequency spectrum of the signal of the fundamental wave of the grid so that broadening of the spectrum before the conversion increases n-fold after the conversion.

5. The image processing apparatus according to claim 1, wherein the at least one processor further adjusts the converted signal so that an intensity of the signal obtained by the conversion is an intensity of a frequency spectrum including the n-th harmonic in the radiation image, and wherein the reduction image is acquired by subtracting a signal obtained by the adjustment from the radiation image.

6. A radiation imaging apparatus comprising:

a radiation detector; and the image processing apparatus according to claim 1 connected to the radiation detector and configured to acquire radiation image data from the radiation detector.

7. An image processing method, performed by a processor executing a program stored in a non-transitory computer-readable storage medium, for processing a radiation image captured using a grid for scattered radiation reduction, the image processing method comprising:

converting, by the processor, a frequency spectrum of a signal of a fundamental wave of the grid into a frequency spectrum of an n-th harmonic so that in a case where a frequency of a peak of the fundamental wave of the grid is fg and a frequency of a peak of the n-th harmonic of the grid is fgn, the frequency fg of the peak of the fundamental wave is the frequency fgn, where n is an integer greater than 1; and acquiring, by the processor, a reduction image obtained by reducing the n-th harmonic in the radiation image, using an intensity of a signal obtained by the conversion.

8. A non-transitory computer-readable storage medium storing a program for causing a computer to execute the image processing method according to claim 7.

\*    \*    \*    \*    \*